(12) United States Patent
Drewes

(10) Patent No.: US 11,273,702 B2
(45) Date of Patent: Mar. 15, 2022

(54) AXLE END ARRANGEMENT

(71) Applicant: SAF-HOLLAND GmbH, Bessenbach (DE)

(72) Inventor: Olaf Drewes, Aschaffenburg (DE)

(73) Assignee: SAF-Holland GmbH, Bessenbach (DE)

( * ) Notice: Subject to any disclaimer, the term of this patent is extended or adjusted under 35 U.S.C. 154(b) by 302 days.

(21) Appl. No.: 16/613,699

(22) PCT Filed: May 24, 2018

(86) PCT No.: PCT/EP2018/063716
§ 371 (c)(1),
(2) Date: Nov. 14, 2019

(87) PCT Pub. No.: WO2018/228800
PCT Pub. Date: Dec. 20, 2018

(65) Prior Publication Data
US 2020/0269677 A1   Aug. 27, 2020

(30) Foreign Application Priority Data
Jun. 16, 2017  (DE) ..................... 10 2017 113 291.0

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *H02K 7/006* (2013.01);
(Continued)

(58) Field of Classification Search
CPC .......... B60K 7/0007; B60K 2007/0092; B60K 2007/0038
See application file for complete search history.

(56) References Cited

U.S. PATENT DOCUMENTS

| | | | |
|---|---|---|---|
| 10,536,051 B2* | 1/2020 | Michel | H02K 5/20 |
| 2005/0245341 A1* | 11/2005 | Mueller | B60K 11/06 |
| | | | 475/5 |

(Continued)

FOREIGN PATENT DOCUMENTS

| | | |
|---|---|---|
| DE | 19805679 A1 | 8/1999 |
| DE | 10338659 A1 | 3/2005 |

(Continued)

OTHER PUBLICATIONS

European Patent Office, International Search Report; dated Sep. 10, 2018.

*Primary Examiner* — Brian L Swenson
(74) *Attorney, Agent, or Firm* — Price Heneveld LLP

(57) ABSTRACT

An axle end arrangement includes a stator unit and a rotor unit, wherein the stator unit is configured to be fixed in a secured manner against rotation about a stub axle relative to an axle stub, wherein the rotor unit is configured to be fixed indirectly or directly on a hub, wherein the stator unit includes a coil arrangement in which, upon rotation of the rotor unit, a voltage is generated, wherein the rotor unit includes a maximum outer radius measured perpendicular to the stub axle, which outer radius is smaller than the smallest distance of a fastening region for a vehicle wheel on the hub from the stub axle.

17 Claims, 1 Drawing Sheet

(51) Int. Cl.
*H02K 7/00* (2006.01)
*H02K 7/116* (2006.01)
*H02K 16/02* (2006.01)

(52) U.S. Cl.
CPC ............ *H02K 7/116* (2013.01); *H02K 16/02* (2013.01); *B60K 2007/0092* (2013.01)

(56) References Cited

U.S. PATENT DOCUMENTS

2007/0257570 A1* 11/2007 Walter .................. B60K 17/046
310/67 R
2009/0000840 A1    1/2009 Murata
2014/0125205 A1* 5/2014 Landfors .............. B60K 17/046
310/67 R
2019/0023128 A1* 1/2019 Tesar ................... B60K 7/0007

FOREIGN PATENT DOCUMENTS

DE           60303934 T2    12/2006
DE    10 2016 203 874 A1    9/2016

* cited by examiner

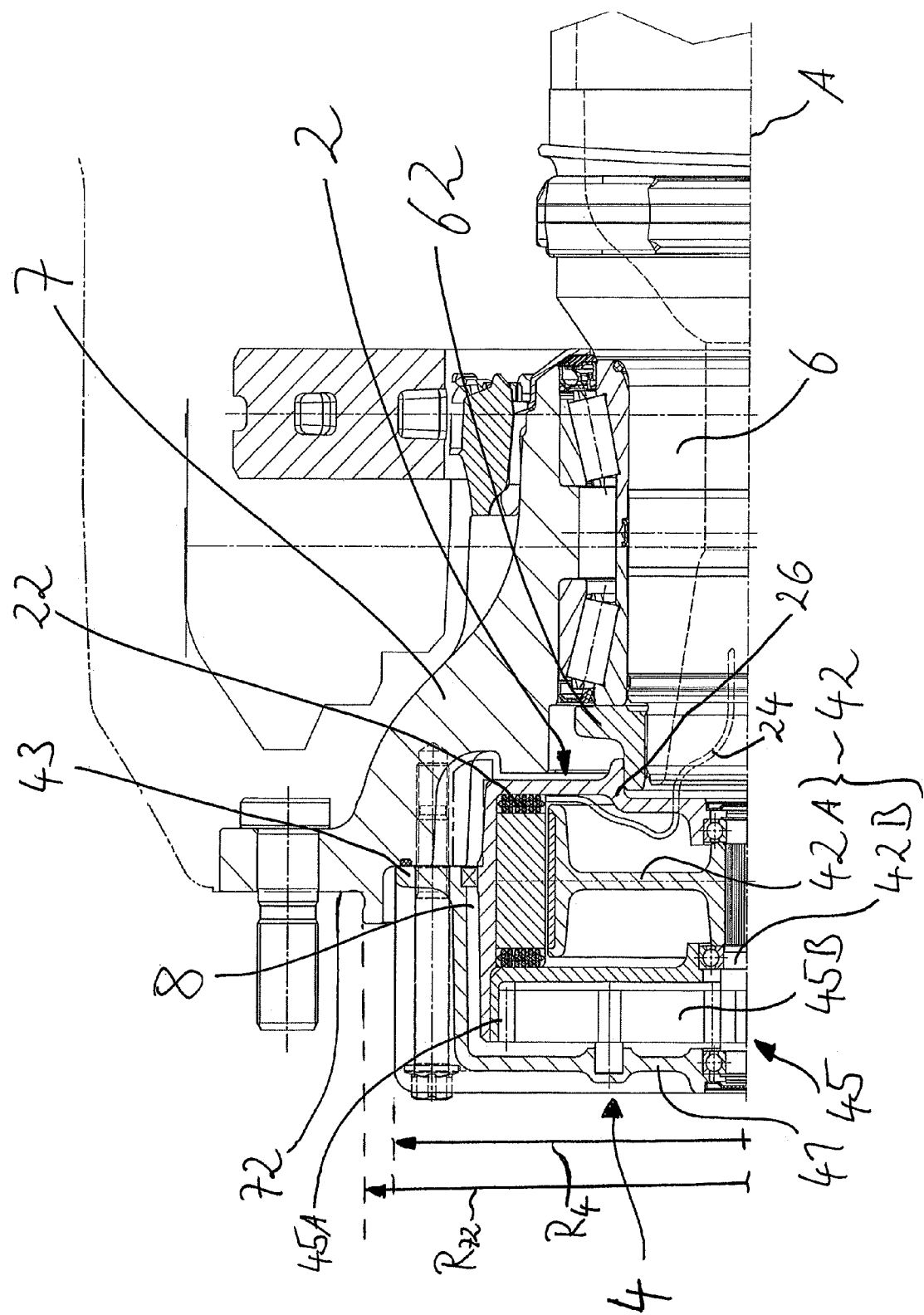

AXLE END ARRANGEMENT

BACKGROUND OF THE INVENTION

The present invention relates to an axle end arrangement for use in utility vehicles.

In particular, the term axle end arrangement relates to a system which is installed in the region of the rotatable bearing of a vehicle wheel at the end of the axle or the axle stub of the vehicle, preferably of the utility vehicle. Such axle arrangements were already used in the prior art. It is thus, for example, known to arrange a hydrostatic additional motor on the vehicle wheel and connected to the axle stub. The arrangement of an electric motor in the axle end region was also already suggested in this case. It has, however, been shown to be problematic in the case of the axle end arrangements known from the prior art that their construction is very complex. Mounting and in particular also dismounting the axle end arrangements are furthermore always problematic in the prior art, wherein the axle end arrangement itself must often be disassembled in order to be able to be dismounted, wherein dirt and foreign bodies can penetrate into the inner region of the axle end arrangement. Moreover, in order to mount and dismount axle end arrangement in the prior art, it is often necessary to also uninstall the vehicle wheel, as a result of which increased mounting outlay arises.

The object of the present invention is to provide an axle end arrangement which ensures high operational reliability and simultaneously can be installed on a vehicle and removed from it again easily and with a small number of operating steps.

SUMMARY OF THE INVENTION

According to the invention, the axle end arrangement has a stator unit and a rotor unit, wherein the stator unit can be fixed in a secured manner against rotation about a stub axle relative to an axle stub, wherein the rotor unit can be fixed indirectly or directly on a hub, wherein the stator unit has a coil arrangement in which, upon rotation of the rotor unit, a voltage is generated, wherein the rotor unit has a maximum outer radius measured perpendicular to the stub axle, which outer radius is smaller than the smallest distance of a fastening region for a vehicle wheel on the hub from the stub axle. In other words, the axle end arrangement has a stationary part, the stator unit, and a part which rotates jointly with the hub and the vehicle wheel of the vehicle, the rotor unit. The rotor unit has an outer radius which is smaller than the fastening region for a vehicle wheel, and in particular preferably smaller than a recess provided on the vehicle wheel. In this manner, the vehicle wheel can be guided beyond the rotor unit to the hub and fixed on the hub. The stator unit furthermore preferably has a coil arrangement which is used for induction of a voltage upon rotation of the rotor unit. It will be obvious in this context that, when a voltage is applied on the coil arrangement of the stator unit, a drive torque can also be transmitted to the rotor unit. The axle stub is preferably a single axle stub which is used, for example, in the case of a steered axle. Alternatively, the axle stub is preferably the axle end of a rigid axle tube on which the wheel bearings, in particular preferably tapered roller bearings, are fixed. The axle stub is preferably embodied to be hollow in order to be able to guide an electrical line through to the coil arrangement and reduce the weight of the axle arrangement. The combination of stator unit and rotor unit which form a joint unit fixed on one another and its arrangement on the hub of the vehicle is such that the vehicle wheel can also be dismounted from the hub beyond the axle end arrangement, ensures high operational reliability since the axle end arrangement does not have to be opened or partially dismounted. As a result of this, simplification of mounting is furthermore ensured since the axle end arrangement does not have to be dismounted from the vehicle in order to change the vehicle wheel. Moreover, the vehicle wheel preferably also does not have to be removed for dismounting of the axle end arrangement.

The rotor unit preferably has at least one magnet. In order to induce a voltage in the coil arrangement of the stator unit, a magnet is preferably provided on the rotor unit. A plurality of magnets are particularly preferably arranged distributed evenly over the circumference of a component which respectively rotates within the coil arrangement. The use of permanent magnets has the advantage that, in contrast to coils, these do not have to be supplied with an electrical voltage, but rather permanently generate a magnetic or electric field which, upon rotation, in turn induces a voltage in the coil arrangement.

Particularly preferably, the rotor unit has a first rotor element and a second rotor element, wherein the first rotor element can be fixed or is preferably fixed on the hub, wherein the second rotor element is arranged substantially within the first rotor element and within the coil arrangement. The rotor unit thus has a first rotor element which primarily serves the purpose of fixing on the hub and a second element which rotates within the coil arrangement in such a manner that an electrical voltage is induced in the coil. The first rotor element is preferably formed to be pot-shaped and simultaneously spans a closed off space jointly with the hub so that the penetration of dirt and foreign bodies as well as liquids into the interior of the axle end arrangement is prevented.

The first rotor element and the second rotor element are preferably coupled to one another via a transmission. In this preferred case, the second rotor element is thus arranged to be rotatable relative to the first rotor element, wherein a transmission is provided between the rotor elements. A gearwheel arrangement can preferably be used as the transmission, which gearwheel arrangement converts the lower rotational speed of the first rotor element into a higher rotational speed of the second rotor element. In this manner, the power output of the generator formed by the second rotor element and the coil arrangement are increased. In the case of an alternative use of the axle end arrangement as a drive for the vehicle wheel, already in the case of a small electrical power applied at the motor formed from coil arrangement and second rotor element, a large torque can furthermore preferably be transmitted to the vehicle wheel in order to achieve additional support for continued movement of the vehicle in particular at low rotational speeds of the vehicle wheel. This possibility for transmitting a torque to a vehicle wheel in a targeted manner is particularly preferably suitable for utility vehicles which are travelling on rough terrain.

The transmission ratio of the transmission particularly preferably lies between 2 and 12, preferably between 4 and 10, and particularly preferably at approx. 6 to 8, wherein there is a higher rotational speed at the second rotor element than at the first rotor element. In other words, the hub of the vehicle thus rotates more slowly jointly with the first rotor element than the second rotor element driven by the transmission. In this manner, the axle end arrangement can be used in particular for inductive braking processes in that a sufficiently high electrical output is removed at the coil arrangement. The transmission with a transmission ratio of at least 2 and preferably 4 to 6 ensures that the rotational speed of the second rotor element is a multiple of the rotational speed of the vehicle wheel. Thanks to the high rotational speeds in the generator defined by second rotor element and coil arrangement, it is possible to already provide the required output in the low-voltage range. The low-voltage range, i.e. preferably a voltage range between 12V and 60V, is characterized in that only very limited safety precautions are necessary for work on the electrical plant since there is only a low risk of injury when working with these voltages. The generator particularly preferably generates a voltage of 48V which can advantageously be used without further transformation in the electrical system of a utility vehicle. As a result of the use of a transmission with a transmission ratio of greater than 4, the wheel arrangement can be configured to be particularly compact since a high power density is achieved by the higher generator rotational speeds. As a result of this, on one hand, the weight is reduced and thus the unsprung mass of the wheel suspension is directly reduced. The installation space requirement of the axle end arrangement can furthermore be reduced. The preferred transmission ratio of 6-8 represents the best compromise between high generator rotational speeds and at the same time low frictional losses in the transmission.

The transmission is particularly preferably formed as a planetary gear transmission, wherein an internal gear of the transmission is formed or fixed on the stator unit, wherein at least one planetary gear is fixed rotatably on the first rotor element, and wherein the planetary gear is connected or can be brought into engagement via a toothing with the second rotor element. A planetary gear transmission, also referred to as a planetary transmission, is particularly suitable for compact and secure transmission of force in the case of a slowly rotating or stationary outer rotor part and a shaft preferably arranged coaxially to this outer rotor. The advantage of the planetary gear transmission is that the two rotational axes of the first rotor element and of the second rotor element in this case can be coaxial to one another, wherein one or a plurality of planetary gears are provided for the transmission of force. An internal gear is advantageously formed on the stator unit, which internal gear has an internal toothing, wherein a planetary gear mounted rotatably on the first rotor element engages in this internal toothing of the internal gear. The planetary gear is simultaneously in engagement via a toothing with the second rotor element so that a rotation of the first rotor element relative to the internal gear of the stator unit causes a rotation of the second rotor element. The high transmission ratios of up to 10 to 12 can particularly preferably be achieved in the case of a particularly compact design with planetary gear transmissions.

The second rotor element particularly preferably has a disc element and a rotor shaft, wherein the rotor shaft has an external toothing for engagement with the planetary gear. A plurality of the permanent magnets already described above are preferably fixed on the disc element of the second rotor element. The permanent magnets can particularly preferably be encapsulated by the preferably metallic production material of the disc element. The rotor shaft bridges the axial offset along the stub axle between the engagement region of the planetary gear and the region formed within the coil arrangement, in which region the disc element is mounted rotatably. The length of the rotor shaft is advantageously only 0.5 to 0.8 times the maximum outer radius of the rotor unit already described above. A compact formation of the entire axle end arrangement can be achieved overall as a result of this compact formation of the rotor shaft.

The second rotor element is particularly preferably mounted rotatably via anti-friction bearings on the stator unit and/or on the first rotor element. In order to ensure a particularly stable mounting of the second rotor element, this is particularly preferably mounted rotatably both on the stator unit and on the first rotor element. In particular, preferably anti-friction bearings, particularly preferably ball bearings, are used for this purpose. The anti-friction bearings are in particular also suitable for also transmitting an axial force component along the stub axle in addition to the supporting force perpendicular to the stub axle in order to hold the rotor shaft in the correct axial position relative to the first rotor element and relative to the stator unit.

The first rotor element preferably has a flange portion, wherein the flange portion has recesses or engagement regions for the engagement of fastening means which can be brought into engagement with the hub. The flange portion on the first rotor element thus particularly preferably has the suitable engagement geometry for fixing the first rotor element via screws or screw bolts, which can be brought into engagement with nuts, on the hub. The flange portion is particularly preferably fitted with an outer radius which is smaller than 0.9 times the smallest inner radius of the fastening region of the hub. The flange portion is advantageously formed on the open side of the preferably pot-shaped first rotor element so that the length of the bolts for fastening the first rotor element is comparatively short.

The first rotor element particularly preferably forms a housing jointly with the hub, wherein the stator unit and the second rotor element are arranged within the housing. The combination of first rotor element and hub particularly preferably forms a closed housing or a closed cavity, within which the transmission and the stator unit and the coil arrangement and the other rotating components of the rotor unit are provided. In this manner, the service life of the axle end arrangement can be increased since the penetration of dirt and foreign bodies can be effectively prevented. A lamellar seal is advantageously provided between the bearing region also arranged within the hub and in which the wheel bearing is ensured and the housing spanned by the first rotor element and the hub in order to prevent an exchange of lubricant between the axle end arrangement and the bearing region.

The axle stub particularly preferably has a bore through which an electrical line to the coil arrangement can be guided or placed. The bore of the axle stub ensures on one hand that an electrical line can be laid in the non-rotating part of the axle end arrangement and on the other hand it ensures weight minimization at the axle stub. The use of an electrical line for the electrical binding of the coil arrangement has the advantage over sliding contact transmission of lower frictional losses and wear.

The stator unit can advantageously be brought into positive-locking engagement with an axle nut such that the stator unit is secured against rotation about the stub axle. In a particularly simple manner, the stator unit can be brought into positive-locking engagement with an axle nut, already present, of a wheel bearing system, wherein the stator unit is secured jointly with the axle nut against rotation. The tightening torque of the axle nut is advantageously a multiple, preferably 5 to 50 times the torque transmitted to the stator unit from the rotor unit. It is particularly preferable that the second rotor element rotates within the stator unit in the direction in which the axle nut is tightened, wherein the torque transmitted between the second rotor element and the stator unit can thus preferably not result in any accidental opening or untwisting of the axle nut. It is nevertheless preferred that the axle nut is secured against rotation relative to the axle stub with means known from the prior art.

The stator unit particularly preferably has a holding region with an internal hexagon geometry. In particular for engagement with an axle nut, the stator unit has a holding region which has an internal hexagon geometry. Alternatively, the internal hexagon geometry of the holding region with a correspondingly hexagonal projection engages on the axle stub itself so that the stator unit is not fixed on the axle nut, but rather directly on the axle stub. Alternatively, it is preferred to provide an internal hexagon-shaped or star-shaped recess at the lateral side of the axle stub, into which recess the stator unit engages with a correspondingly hexagonal or star-shaped holding region.

The stator unit is particularly preferably secured substantially by the rotor unit against displacement along the stub axle relative to the axle stub. In other words, the stator unit is thus pushed onto the axle stub or the axle nut is only pushed on along the stub axle, wherein it is ensured that the stator unit is secured against displacement along the stub axle by corresponding engagement geometries of the rotor unit and the stator unit. In the present case, this axial maintenance force is transmitted in particular via the anti-friction bearings which are arranged between the first rotor element, the second rotor element and the stator unit. It is, however, also conceivable that axial roller bearings are used which transmit a supporting force along the stub axle from the rotor unit to the stator unit. The holding force in the axial direction of the axle end arrangement is thus preferably generated by the binding of the first rotor element to the hub.

A voltage in the low-voltage range is advantageously generated in the coil arrangement. As a result of the very high rotational speed of the second rotor element in comparison with the rotational speed of the vehicle wheel, a lower voltage can advantageously be generated in the coil arrangement with the same output. In other words, a greater output can be generated in the case of the same low voltage in the low-voltage range with the axle end arrangement than is known from the prior art.

BRIEF DESCRIPTION OF THE DRAWINGS

Further advantages and features of the present invention will become apparent from the following description with reference to the enclosed FIGURE.

FIG. 1 shows a sectional view through an embodiment of an axle end arrangement according to the invention.

DETAILED DESCRIPTION OF THE PREFERRED EMBODIMENTS

A hub 7 is mounted rotatably via tapered roller bearings on an axle stub 6. Hub 7 has a fastening region 72 for a vehicle wheel, wherein, for example, a wheel bolt is pushed through a corresponding flange portion in said fastening region 72, on which flange portion a wheel nut can be fixedly screwed in order to fix the vehicle wheel (not shown) on hub 7. Fastening region 72 has a minimum distance $R_{72}$ from stub axle A, which in the present case, since fastening region 72 is formed to be rotationally symmetrical, is preferably the inner radius of fastening region 72. A rotor unit 4 is advantageously provided which is composed of a first rotor element 41 and a second rotor element 42. Rotor unit 4 has a maximum outer radius $R_4$ which is smaller than minimum distance $R_{72}$ of fastening region 72 from stub axle A. As a result of this, it is possible on one hand to guide the vehicle wheel beyond rotor unit 4 to the axle and remove it again from the axle, and on the other hand it is also possible to dismount the rotor unit from hub 7 in the case of an installed vehicle wheel. A transmission 45 is preferably provided within first rotor element 41, wherein this transmission 45 is formed as a planetary gear transmission. An internal gear 45A is formed on stator unit 2, in which internal gear 45A a planetary gear 45B engages via a toothing. Planetary gear 45B is in turn mounted rotatably on first rotor element 41, wherein a rotation of first rotor element 41 jointly with hub 7 thus brings about a rotational movement of planetary gear 45B relative to first rotor element 41. Planetary gear 45B is in engagement via a toothing with a rotor shaft 42B of second rotor element 42. Rotor shaft 42B is mounted rotatably both on first rotor element 41 and on stator unit 2 via anti-friction bearings, preferably ball bearings. Rotor shaft 42B is furthermore connected via an external toothing in a rotationally conjoint manner to a disc element 42A so that a rotation of rotor shaft 42B is converted directly into a rotation of disc element 42A. Preferably one magnet, particularly preferably a plurality of permanent magnets is/are arranged and fixed on disc element 42A. Disc element 42A preferably rotates within a cylindrical cavity spanned by a coil arrangement 22. The rotation of disc element 42A and the permanent magnets within coil arrangement 22 preferably induces an electrical voltage which can be discharged via an electrical line 24 through a recess at the axle stub and thus can be used particularly preferably to charge a battery or to supply add-on devices of the utility vehicle. First rotor element 41 has a flange portion 43 in which a fastening means embodied preferably as a screw bolt can be brought into engagement. It will be obvious that preferably a plurality of fastening elements distributed evenly over the circumference of first rotor element 41 can be introduced in each case at flange portion 43 into corresponding bores and brought into engagement with hub 7. Stator unit 2 is particularly preferably secured via a holding region 26 in a positive-locking manner against rotation relative to an axle nut 62 and to axle stub 6. Stator unit 2 is preferably only pushed on along the stub axle in the direction pointing to the right in the FIGURE of axle nut 62 and is secured against displacement relative to axle stub 6 and relative to hub 7 only by the axial holding force which is transmitted by the first rotor element and the corresponding anti-friction bearings formed as ball bearings between rotor shaft 42B and stator unit 2.

REFERENCE NUMBERS

2—Stator unit
22—Coil arrangement
24—Electrical line
26—Holding region
4—Rotor unit
41—First rotor element
42—Second rotor element
42A—Disc element
42B—Rotor shaft
43—Flange portion
45—Transmission
45A—Internal gear
45B—Planetary gear
6—Axle stub
62—Axle nut
7—Hub
72—Fastening region
8—Housing
A—Stub axle $R_4$—Maximum outer radius rotor unit
$R_{72}$—Smallest distance fastening portion

The invention claimed is:

1. An axle end arrangement for use in utility vehicles, comprising:
   a stator unit; and
   a rotor unit;
   wherein the stator unit is configured to be fixed in a secured manner against rotation about a stub axle relative to an axle stub;
   wherein the rotor unit is configured to be fixed indirectly or directly on a hub;
   wherein the stator unit has a coil arrangement in which, upon rotation of the rotor unit, a voltage is generated;
   wherein the rotor unit has a maximum outer radius measured perpendicular to the stub axle, which outer radius is smaller than the smallest distance of a fastening region for a vehicle wheel on the hub from the stub axle,
   wherein the rotor unit has a first rotor element and a second rotor element;
   wherein the first rotor element is configured to be fixed on the hub;
   wherein the second rotor element is mounted within the first rotor element and is arranged within the coil arrangement;
   wherein the first rotor element has a flange portion;
   wherein the flange portion has recesses for the engagement of a fastener which can be brought into engagement with the hub;
   wherein the first rotor element includes a housing jointly with the hub; and
   wherein the stator unit and the second rotor element are arranged within the housing.

2. The axle end arrangement as claimed in claim 1, wherein the first rotor element and the second rotor element are coupled to one another via a transmission.

3. The axle end arrangement as claimed in claim 2, wherein the transmission ratio of the transmission lies between 2 and 12, wherein there is a higher rotational speed at the second rotor element than at the first rotor element.

4. The axle end arrangement as claimed in claim 3, wherein the transmission ratio lies between 4 and 10.

5. The axle end arrangement as claimed in claim 4, wherein the transmission ratio lies between 6 and 8.

6. The axle end arrangement as claimed in claim 3, wherein the transmission includes a planetary gear transmission, wherein an internal gear of the transmission is fixed on the stator unit, wherein at least one planetary gear is fixed rotatably on the first rotor element, and wherein the planetary gear is connected with the second rotor element or is configured to be brought into engagement with the second rotor element via a toothing.

7. The axle end arrangement as claimed in claim 6, wherein the second rotor element has a disc element and a rotor shaft, and wherein the rotor shaft has an external toothing for engagement with the planetary gear.

8. The axle end arrangement as claimed in claim 7, wherein the stator unit is configured to be brought into positive-locking engagement with an axle nut such that the stator unit is secured against rotation about the stub axle.

9. The axle end arrangement as claimed in claim 8, wherein the stator unit is substantially secured by the rotor unit against displacement along the stub axle relative to the axle stub.

10. The axle end arrangement as claimed in claim 9, wherein a voltage in the low-voltage range, is generated in the coil arrangement.

11. The axle end arrangement as claimed in claim 10, wherein the voltage generated in the coil arrangement is between 12V and 60V.

12. The axle end arrangement as claimed in claim 2, wherein the transmission includes a planetary gear transmission, wherein an internal gear of the transmission is fixed on the stator unit, wherein at least one planetary gear is fixed rotatably on the first rotor element, and wherein the planetary gear is connected with the second rotor element or is configured to be brought into engagement with the second rotor element via a toothing.

13. The axle end arrangement as claimed in claim 12, wherein the second rotor element has a disc element and a rotor shaft, and wherein the rotor shaft has an external toothing for engagement with the planetary gear.

14. The axle end arrangement as claimed in claim 1, wherein the stator unit is configured to be brought into positive-locking engagement with an axle nut such that the stator unit is secured against rotation about the stub axle.

15. The axle end arrangement as claimed in claim 1, wherein the stator unit is substantially secured by the rotor unit against displacement along the stub axle relative to the axle stub.

16. The axle end arrangement as claimed in claim 1, wherein a voltage in the low-voltage range, is generated in the coil arrangement.

17. The axle end arrangement as claimed in claim 16, wherein the voltage generated in the coil arrangement is between 12V and 60V.

* * * * *